June 30, 1959 L. C. JESTY ET AL 2,892,883

COLOR TELEVISION

Filed Oct. 18, 1954 2 Sheets-Sheet 1

Inventors:
Leslie Connock Jesty and Alan Elmer Sarson
By their attorneys:
Baldwin & Wight Inventors:
Leslie Connock Jesty & Alan Elmer Sarson
By their attorneys:
Baldwin & Wight United States Patent Office 2,892,883

Patented June 30, 1959

2,892,883

COLOR TELEVISION

Leslie Connock Jesty, Burnham-on-Crouch, and Alan Elmer Sarson, Great Baddow, England, assignors to Marconi's Wireless Telegraph Company Limited, London, England, a British company Application October 18, 1954, Serial No. 462,964

Claims priority, application Great Britain October 22, 1953

13 Claims. (Cl. 178—5.4)

This invention relates to color television and like transmitting systems of the kind in which the image for transmission is effectively divided into a plurality of portions with the aid of an optical color grid so that such portions are respectively associated with given colors and are together presented for scanning in a cyclic predetermined sequence, whereby the signal derived from the scanning operation contains several carrier frequencies depending on the relative arrangement of the said portions, each carrier frequency being thus attributable to a particular color.

According to the present invention there is provided a color television transmission system of the kind set forth, wherein the color grid is positioned in the optical path of the tube, the grid comprising a plurality of strips or bars of additive light filtering medium, each of which strips or bars permits light of a particular color to pass therethrough, the strips or bars being adjacently arranged in a pre-determined cyclic sequence in accordance with their light filtering characteristics, so that on line scanning by the electron beam transversely across the strips or bars, and output signal (or signals) is (or are) obtained having carrier frequencies therein, each of which carrier frequency is determined by the relative spacing of the strips or bars having the same light filtering characteristics. Additive light filtering media are those which, when white light is passed through them simultaneously and the output is integrated, provide white light of substantially the same spectral distribution as the ingoing light to them. For example the well known tri-color primaries, red, green and blue.

For a better understanding of the invention and to show how the same may be carried into effect reference will now be made to the accompanying drawings, in which.

A color grid for use with a three color system (Fig. 1) comprises a plurality of adjacent strips of (additive) light filtering medium. The strips are sequentially arranged, and each complete sequence is cyclically repeated so that when an image for scanning is "seen" through the grid, and when line scanning proceeds across the strips or bars resulting from the grid, carrier frequencies corresponding to three selected primary colors, are produced, the colors being chosen, for example, as red, blue and green. The three colors are indicated in Fig. 1A by means of different forms of shading and a color key is indicated in Fig. 1. The color grid is intended to be located in the optical system of the camera, with the color grid surface disposed at an angle to the camera line scanning direction. The color grid surface is normally perpendicular to the line scanning direction and is oriented so as to have the strips perpendicular to the direction of the electron beam scanning as appears from the arrow A which indicates this direction in Fig. 1A.

The carrier frequencies may be inter-related in any desired manner, and Fig. 1A shows a sequential arrangement of the adjacent strips which will produce a simple 2:1 ratio between the carrier frequencies; that is, if the separation of the color grid elements affected by the blue light produces a carrier frequency F, the red bars are arranged so that they will produce a carrier frequency 2F, and the green bars so that they will produce a carrier frequency 4F. Any variations of the intensity of light of a particular color will appear as amplitude modulation of its associated color carrier frequency. The spacing of the color strips should preferably be such that the fundamental frequency (in Fig. 1A, the blue strips) obtained, is at least as high as the highest video frequency that is likely to be produced in the television system. For example, in a four hundred and five line 3 mc./second television system, using the color grid of Fig. 1A, the separation between the blue strips might be such as to produce a 3 mc./second carrier frequency (F), likewise the red strips would be spaced so as to produce a 6 mc./second carrier frequency (2F), and the green strip spacing would produce a 12 mc./second carrier frequency (4F). In Fig. 1A, it will be seen that, in addition to the blue, red and green color strips, each color grid cycle X includes a black strip. The provision of these black strips is not essential but with the color strip sequence provided in Fig. 1A the black strips are necessary in order that the strips of the same color shall occur at regular intervals. It will be apparent from Fig. 1A that each sequence X commences and ends with a strip of the same color, and in consequence the first and last strips of two adjacent sequences, would, in effect, merge during scanning.

Figure 1B:
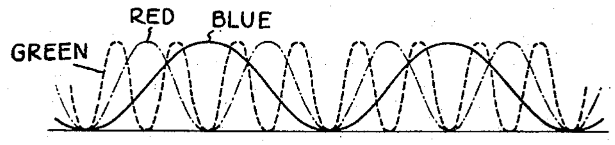
Fig. 1B shows diagrammatically the relationship between the characteristic carrier frequencies produced by the color grid of Fig. 1A.
Figure 1A:
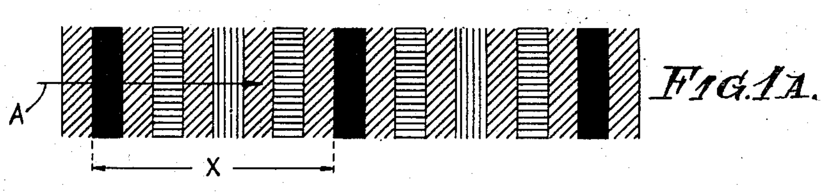
Fig. 1A shows a color grid using the colors shown in the color key of Fig. 1 and intended for use with a three color television system, the grid producing 2:1 ratio between the characteristic color frequencies.
Figure 1:
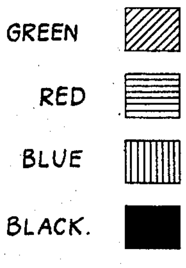
Fig. 1 shows a color key for the system of our invention.

Fig. 1B diagrammatically shows (using sine waves) the relationship between the characteristic frequencies of the selected primary colors. In the drawing the "full-line" wave represents the carrier frequency for the blue light. As there is only a single blue color strip per color grid cycle in Fig. 1A, the blue carrier attains its maximum only once per color grid cycle. The chain-dotted line in Fig. 1B represents the red carrier frequency, and as there are two red color strips per grid cycle, the red carrier reaches its maximum twice per grid cycle, whence the red carrier frequency is double that of the blue. The green carrier frequency is indicated in Fig. 1B as a dotted line and its frequency is seen to be four times that of the blue carrier.

Figure 2:
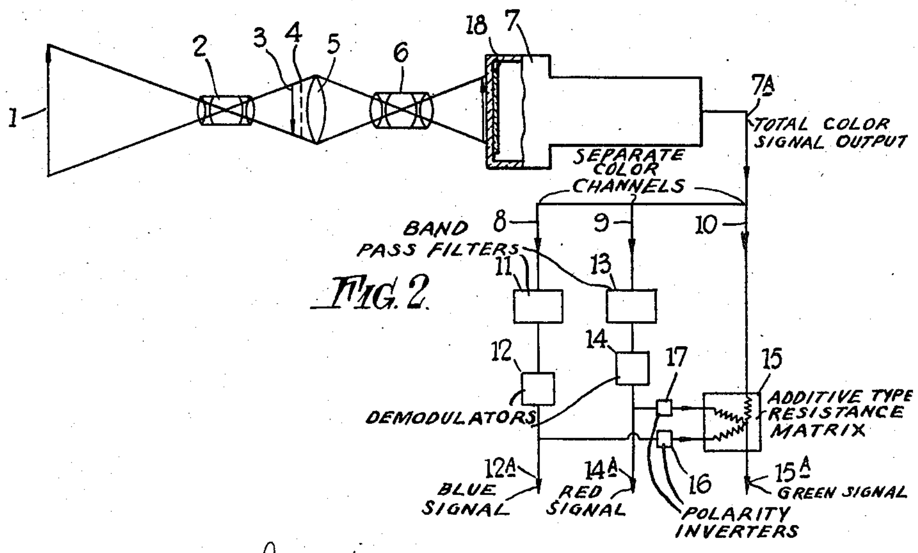
Fig. 2 is a schematic diagram of a practical arrangement for producing and separating the characteristic color frequencies.

Fig. 2 shows a practical arrangement using a color grid described with respect to Fig. 1A. The camera objective 2 focusses an image 3 of an object 1 upon the color grid 4. A field lens 5 in conjunction with a second objective 6 focusses an image of the object 1 and the color grid 4 upon the photocathode 18 of a television camera 7. The total signal output 7A from the camera 7 is divided into three channels 8, 9 and 10.

The total signal output 7A from the camera passes through each of the three channels. In order to separate the total output signal into its respective color components, the total signal flowing in the first channel 8 is passed through a band-pass filter 11 tuned to a mid-frequency F and a demodulator 12 for the blue carrier, whereby the desired "blue-signal" 12A is obtained. The second channel 9 contains a band-pass filter 13 tuned to a mid-frequency 2F and a demodulator 14 for the red carrier frequency, whereby the "red-signal" 14A is extracted from total signal flowing into the channel 9. The third channel 10 contains an "additive" type resistance matrix 15. The latter is connected to each of the modulators 12 and 14 by way of polarity inverters 16 and 17. These inverters change the "sign" of the extracted blue and red signals, and when the signals having the reversed signs are applied to the resistance matrix 15, the output 15A from the latter represents the "green-signal." Thus, with this arrangement, if the number of colors used in the system is $n$, then $(n-1)$ signal outputs are derived by means of filters and the $n$th output is dervied by subtracting the total of $(n-1)$ outputs from the total of $n$ outputs. If it is found that the fundamental "blue-signal" has a frequency which is lower than the maximum resolution frequency television video signal, the optical image produced by the first objective may be defocussed so that the optical resolution is brought to a value which produces a maximum video frequency lower than the selected fundamental color frequency.

In Fig. 2, the grid is external as regards the camera. This need not be so since the grid may consist of a plurality of transparent strips of suitable colored material such as glass or enamel, or strips of interference color filters, upon which the photo-sensitive material may be deposited to form the camera photo-cathode.

Figure 3:
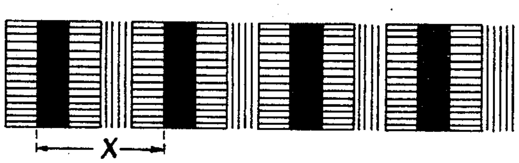
Fig. 3 shows a color grid intended for use with a two color television system (the grid producing a 2:1 ratio between the characteristic frequencies)

Fig. 3 shows a suitable arrangement (using the color key of Fig. 1) of the color strips for a two color television system, and as in the color grid of Fig. 1, the color strips forming the grid are separated so as to produce a 2:1 ratio between characteristic frequencies relating to the primary colors red and blue. It is seen that here also there are black bars for the same reason as before.

In a practical arrangement (not shown) using the color grid of Fig. 3, it would be necessary to extract electrically only one of the "color signals" from the total camera tube signal output.

A color grid of the type shown in Fig. 3 is suitable for use in a color television camera using two pick-up tubes, of which one tube is arranged to produce signals corresponding to a high definition of one color and the other tube is arranged to produce signals corresponding to a low definition of two colors.

Figure 4:
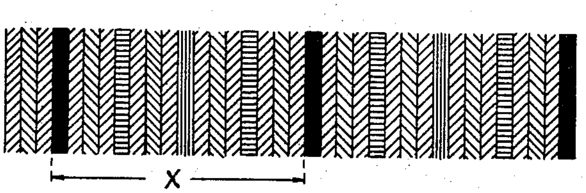
Fig. 4 shows a color key and a color grid intended for use with a four color television system (the grid producing a 2:1 ratio between the characteristic frequencies)
Figure 4A:
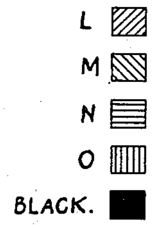
Fig. 4A shows a color key designating the color grid of Fig. 4.

Fig. 4 shows the sequential arrangement of the color grid strips for use with a four color television system, consisting of colors red, green, blue, etc. designated L, M, N, O and black according to the color key shown in Fig. 4*a*. The arrangement of the strips within each color grid cycle X is such that the 2:1 ratio between the characteristic frequencies would be produced. From the Fig. 4 it is seen that each color grid cycle X comprises a total of sixteen strips, there being one black strip, one color O, two of color N, four of color M and 8 of color L.

In order to extract the four "color-signals" from the total signal output of the camera it is necessary to extract electrically only three such "color-signals," since the remaining "color-signal" may be obtained by electrical subtraction of the three previously separated signals from the total signal output.

From the above described color grids relating to two color, three color and four color systems, it is seen that, in general, the electrical filter separation of the "color-signal" components involves the separation of one less "color-signal" than the total number of selected primary colors, since the remaining signal may be obtained by electrical separation. That is, with $n$ colors, it is necessary to extract only $(n-1)$ colors, as the $n$th color may be obtained by electrical subtraction.

Figure 5:
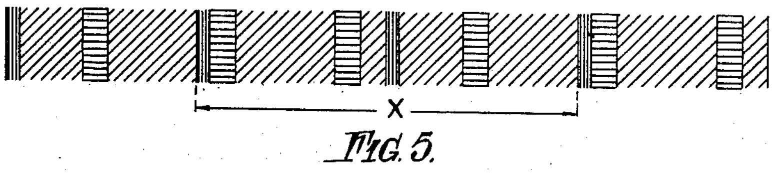
Fig. 5 shows a color grid for use with a three color system, the grid producing a 3:2 ratio between characteristic frequencies.

Fig. 5 (color key as Fig. 1), shows a color grid, without black bars, which is suitable for the production of blue and red characteristic color frequencies in the ratio of 2:3. The figure also shows the relative width of the grid color strips. These latter are selected so that each cycle of color grid X contains two blue strips and three red strips. The blue and red strips are separated by green strips, the relation between the total areas of the green, red and blue strips being 22 green:6 red:2 blue; respectively.

When green light is present in the object the grid shown in Fig. 5 tends to produce a certain amount of cross-talk between the selected primary colors red and blue. To reduce or substantially eliminate this tendency, the areas of the wide green color strips of Fig. 5 are reduced by the introduction of black bars. The effect of the introduction of the black bars is to raise the characteristic carrier frequency of the green color signal, thereby avoiding cross-talk into the blue and red frequencies.

Figure 6:
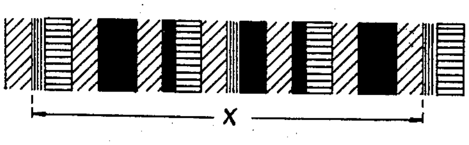
Fig. 6 shows the grid of Fig. 5, when provided with black bars.

Fig. 6 (color key as in Fig. 1), shows a first method of introducing black bars into the color grid to reduce the size of the green strips.

Figure 7:
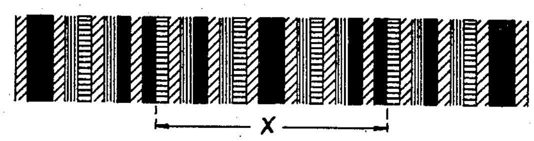
Fig. 7 shows the color grid of Fig. 5, when provided with black bars having a different spacing from that shown in Fig. 6.

Fig. 7 (color key as in Fig. 1), shows a second method of introducing the black bars into the wide green strips of Fig. 5, the effect being the same as that in Fig. 6.

While we have described our invention in certain preferred embodiments we realize that modifications may be made and we desire that it be understood that no limitations upon our invention are intended other than may be imposed by the scope of the appended claims.

We claim:

1. A color television transmission system comprising a television pickup camera tube, a color grid positioned in the optical path of said tube, said grid comprising a plurality of strips of additive light filtering medium and each strip being adapted to permit light of a particular color to pass therethrough, said color grid being adapted to divide the image for transmission into a plurality of portions, each of said portions being associated with given colors, means for scanning said portions at right angles to their length in cyclic predetermined sequence, means for developing from the derived signals from the scanning operation separate carrier frequencies dependent upon the relative arrangement of said portions, the spacing between said portions being related to the fundamental carrier frequency whereby said frequency generated is not less than the highest video frequency produced by said system.

2. A system as claimed in claim 1, wherein said color grid is located externally of said tube, and wherein said system includes means for producing a combined image of an object and of said color grid on the photo-cathode of said tube.

3. A system as claimed in claim 1, wherein said color grid is disposed in a plane that is perpendicular to the direction of line scanning across said strips or bars.

4. A system as claimed in claim 1, wherein the color grid comprises a plurality of transparent strips of colored material, upon which a photo-sensitive material may be deposited thereby to form the camera photo-cathode.

5. A system as claimed in claim 1, wherein said color grid comprises a plurality of strips of interference color filters, upon which a photo-sensitive material is deposited thereby to form the camera photo-cathode.

6. A system as claimed in claim 1, wherein the spacing of said strips or bars within said pre-determined cyclic sequence is related to the fundamental color carrier frequency whereby said frequency is at least as high as the highest video frequency that is likely to be produced by said system.

7. A system as claimed in claim 1, wherein when $n$ colors are used in said system, means are provided for electrically separating $(n-1)$ signal outputs from the total output signal of the tube, and wherein electrical subtraction means are provided whereby the $n$th color signal output associated with the $n$th color is arranged to be produced by subtracting said $(n-1)$ signal outputs from said total output signal.

8. A system as claimed in claim 1, wherein when $n$ colors are used in said system, means are provided for electrically separating $(n-1)$ signal outputs from the total output signal of the tube, and wherein electrical subtraction means are provided whereby the $n$th color signal output associated with the $n$th color is arranged to be produced by subtracting said $(n-1)$ signal outputs from said total output signal, wherein the means for separating said $(n-1)$ signal outputs includes $(n-1)$ channels, each of which contains electrical filtering means, demodulating means and means for tapping off the output from the demodulating means and applying the tapped-off output via polarity inverting means to said electrical subtraction means, and wherein said latter means is located in an $n$th channel.

9. A color television camera tube which includes a plurality of strips of additive light filtering medium which are disposed at right angles to the line of scan in the camera tube and arranged in cyclic sequence in accordance with their light filtering characteristics and wherein a black strip is provided at one end of each color sequence, the arrangement being such that said black strip effectively separates two adjacent sequences and provides a 2:1 frequency ratio between the carrier frequencies associated with the colors utilized in the system.

10. A color television camera tube which includes a plurality of strips of additive light filtering medium which are disposed at right angles to the line of scan in the camera tube and arranged in cyclic sequence in accordance with their light filtering characteristics and wherein the relative spacing between the strips forming said sequence is so selected as to provide a 2:1 frequency ratio between the carrier frequencies associated with the colors utilized in the system.

11. A color television camera tube which includes a plurality of strips of additive light filtering medium which are disposed at right angles to the line of scan in the camera tube and arranged in cyclic sequence in accordance with their light filtering characteristics, the relative spacing between the strips forming said sequence being selected to provide a 2:1 frequency ratio between the carrier frequencies associated with the colors utilized in the system and wherein when three primary colors, blue, red and green, are used, each sequence comprises one blue strip, two red strips and four green strips.

12. A color television camera tube which includes a plurality of strips of additive light filtering medium which are disposed at right angles to the line of scan in the camera tube and arranged in cyclic sequence in accordance with their light filtering characteristics, wherein the relative spacing between the strips forming said sequence is so selected as to provide a 2:3 frequency ratio between the color carrier frequencies of the first and second colors of a three color system, the arrangement being such that the strips related to said first and second colors are separated by the strips associated with the remaining color, and wherein the areas of the strips related to said three colors are so chosen as to occupy the following relative areas: two of the first color: six of the second color: twenty-two of the remaining color.

13. A color television camera tube which includes a plurality of strips of additive light filtering medium which are disposed at right angles to the line of scan in the camera tube and arranged in cyclic sequence in accordance with their light filtering characteristics, the relative spacing between the strips forming said sequence being so selected as to provide a 2:3 frequency ratio between the color carrier frequencies of the first and second colors of a three color system, the arrangement being such that the strips related to said first and second colors are separated by the strips associated with the remaining color, wherein the areas of the strips related to said three colors are so chosen as to occupy the following relative areas; two of the first color, six of the second color, twenty-two of the remaining color, and wherein black strips are introduced into the color strips of the remaining color so as to raise the color carrier frequency of this color, the arrangement being such that "cross-talk" between the color carrier frequencies of said first and second colors is reduced.

References Cited in the file of this patent

UNITED STATES PATENTS

| | | |
|---|---|---|
| 2,490,812 | Huffman | Dec. 13, 1949 |
| 2,589,386 | Huffman | Mar. 18, 1952 |
| 2,705,258 | Lesti | Mar. 29, 1955 |
| 2,733,291 | Kell | Jan. 31, 1956 |
| 2,736,890 | Perilhou et al. | Feb. 28, 1956 |
| 2,738,379 | James et al. | Mar. 13, 1956 |